W. N. SELIG.
FILM MAGAZINE.
APPLICATION FILED DEC. 5, 1910.

999,679.

Patented Aug. 1, 1911.

2 SHEETS—SHEET 1.

Witnesses:

Inventor:
William N. Selig.

W. N. SELIG.
FILM MAGAZINE.
APPLICATION FILED DEC. 5, 1910.

999,679.

Patented Aug. 1, 1911.
2 SHEETS—SHEET 2.

Witnesses:

Inventor:
William N. Selig,

UNITED STATES PATENT OFFICE.

WILLIAM N. SELIG, OF CHICAGO, ILLINOIS, ASSIGNOR TO THE SELIG POLYSCOPE COMPANY, OF CHICAGO, ILLINOIS, A CORPORATION OF ILLINOIS.

FILM-MAGAZINE.

999,679.   Specification of Letters Patent.   Patented Aug. 1, 1911.

Application filed December 5, 1910. Serial No. 595,782.

*To all whom it may concern:*

Be it known that I, WILLIAM N. SELIG, a citizen of the United States, residing at Chicago, in the county of Cook and State of Illinois, have invented certain new and useful Improvements in Film-Magazines, of which the following is a specification.

The magazine of the present invention relates to a type employed with moving picture projecting machines for the purpose of containing the film which is to be run through the machine, although, obviously, the magazine is also adapted for use in receiving the film after it has been run through the machine.

One object of the present invention is to provide a mouth-piece on the magazine through which the film passes, which mouth-piece will be movable and adjust itself to the different positions which the film may assume as it is passing out from the magazine, thereby eliminating any bending or crimping of the film; and a further object of the invention is to provide said mouth-piece with a series of members which will serve to accurately guide the film as it is passing through said mouth-piece, which will be of a nature to provide an easy movement of the film through the mouth-piece and reduce the friction accompanying such operation and at the same time will act to keep the film from buckling or otherwise becoming crimped during its passage through the mouth-piece.

The invention further consists in the features of construction and the combination of parts hereinafter described and claimed.

Figure 1:
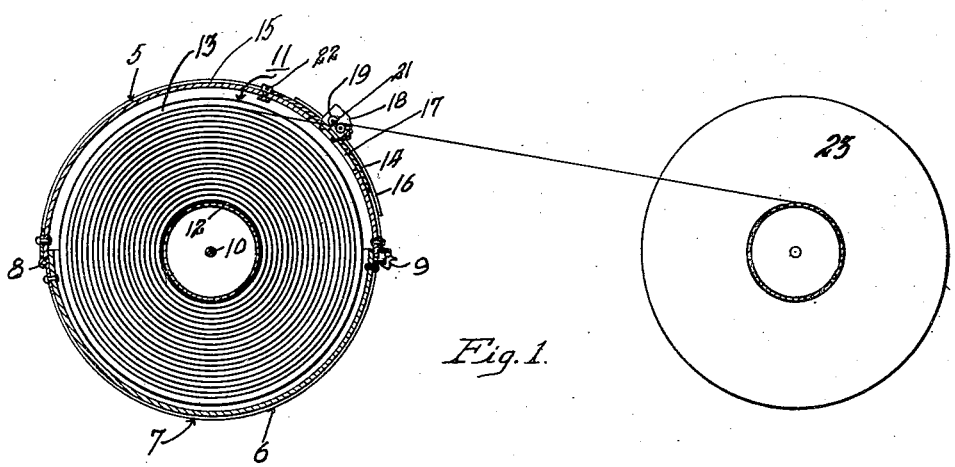
Figure 2:
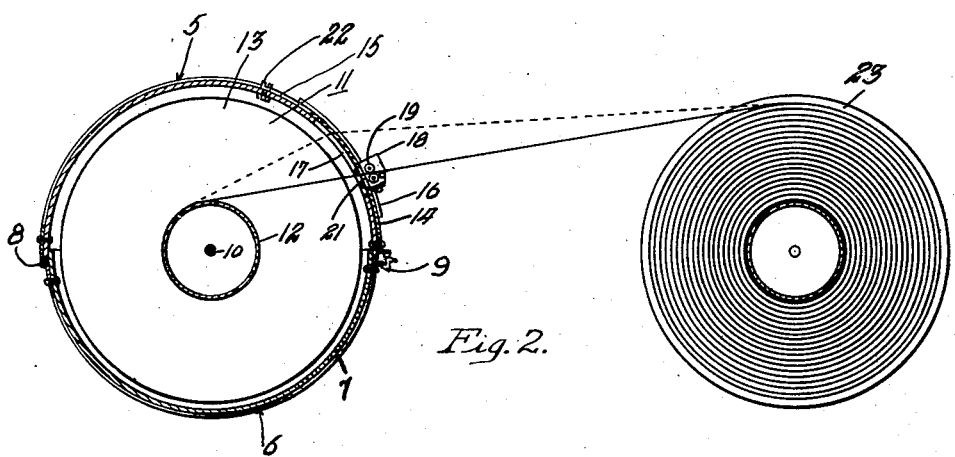
Figure 3:
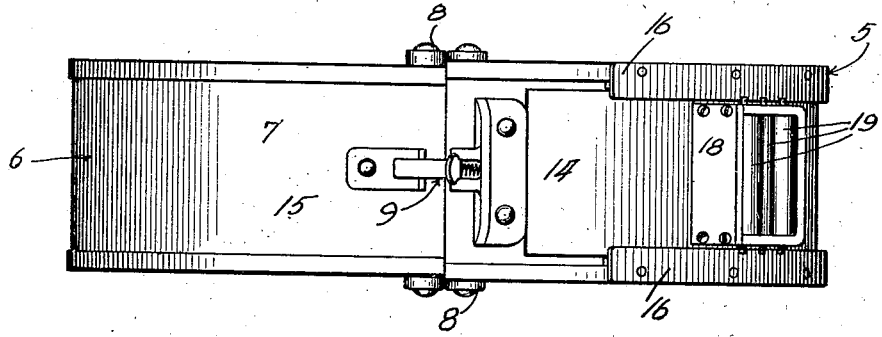

In the drawings, Figure 1 is a diagrammatic view, showing a film just beginning to be unwound from the reel within the magazine onto the take-up reel upon the machine; Fig. 2, a view similar to Fig. 1, showing a film completely unwound from the reel within the magazine and completely wound upon the take-up reel; Fig. 3, an edge view of the magazine; and Fig. 4, a face view, showing a portion of the magazine with the movable mouthpiece of the present invention mounted thereon.

In the art to which the present invention relates, it has been customary to provide a magazine in which is placed the roll of film to be run through the projecting machine, and the film, after passing through the machine, is wound upon a take-up reel, which is operated by the movements of the projecting mechanism. When the roll is initially placed within the magazine, it is, of course, of a greatly increased diameter from the spindle on the take-up reel. As the film is unwound from the reel within the magazine and onto the reel upon the machine, the relative size of the two rolls of film, namely, the roll within the magazine and the roll upon the take-up reel, will be constantly changing.

It has been customary to provide a mouth-piece on the magazine through which the film passes, which mouth-piece was in the form of a fixed slot in the body of the magazine. As the size of the two rolls of films changes, the angle at which the film will leave the reel within the magazine constantly changes; and if the mouth-piece of the magazine out of which the film passes remains in the same position, there will occur a bending or crimping of the film around the edges of the mouth-piece. This at times results in the mutilation or the tearing asunder of the film and has been found to be objectionable.

It is the primary object of the present invention to overcome these defects noted in the prior constructions.

The magazine of the present invention comprises two sections 5 and 6, each similar in construction, and coöperating to form a circular box 7. The two sections, as shown, are hinged at 8 and are secured together by suitable fastening means 9. A rod 10 extends centrally and transversely through the magazine and is fixedly held in the walls thereof, so as to prohibit its rotation with the movements of the reel. Mounted upon the rod 10 is a reel 11 comprising a hub portion 12 and walls 13; and upon the hub of the reel 11 is wound the film to be projected. All of the foregoing described parts are old and well known in the art and may be changed as desired, and they are not deemed to be a portion of the present invention.

Figure 4:
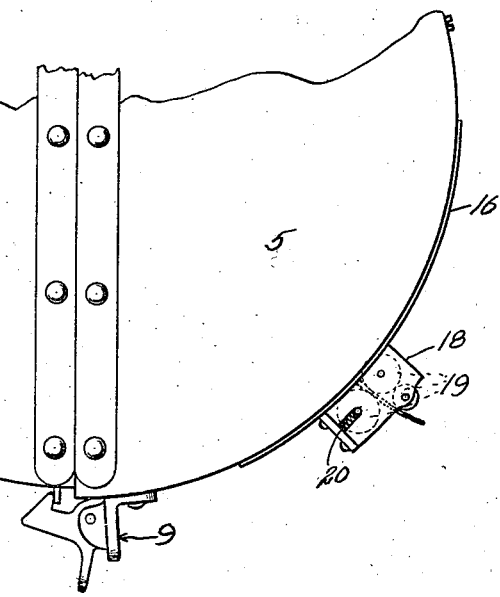

The present invention lies particularly in the construction and arrangement of the mouth-piece, which serves to guide the film in its passage into or out of the magazine in a manner whereby no bending or crimping of the film will take place during such operation; and the mechanism for accomplishing this result, together with other portions of the mechanism allied thereto, is as follows: A plate 14 is provided, which is bent to conform to the configuration of the periphery of the rim 15 of the magazine and is loosely mounted upon said rim. The rim is provided along its edges for a predetermined distance with overhanging flanges 16, which coöperate to form a guide-way for the plate 14. The rim 15 is cut away for a predetermined distance to form an elongated opening 17; and the plate 14 is preferably of a size so that when it is in its extreme thrown position in either direction the ends of it will protrude beyond the termini of the slot 17. Thus the plate at all times serves to close the slot 17 and prevent ingress of dirt through said slot into the magazine. The plate 14 is provided with a bracket member 18, which serves as a mounting for a plurality of rollers 19. Two of the rollers, as shown more clearly in Fig. 4, are positioned one above the other, and the third roller is oppositely disposed from the first-mentioned rollers, and this roller is maintained in normal engagement with at least one of the first-mentioned rollers by means of a tension member 20. The plate 14 is provided with a slot 21, which is positioned to lie below the bracket 18 and in alinement with the juncture of the rollers 19; and through this slot 21 the film passes from the interior of the magazine into position between the rollers 19. The slot 21, as shown, is reduced in size in comparison with the slot 17 and remains in constant register with the slot 17 during the movement of the plate 14. The plate 14 is limited in its movement in one direction by means of the locking mechanism 9 and in the opposite direction by means of a headed member 22, although, of course, the exact construction of these stop members is immaterial.

In Figs. 1 and 2 is shown a take-up reel 23. This device is usually positioned upon the projecting machine and is operated by the movements of the machine, the reel 11 not being a power driven reel. But the film is unwound from this reel by the pull exerted upon it by the mechanism of the projecting machine.

The operation of the device is as follows: The sections of the magazine are unfastened and swing apart, permitting the reel 11, with the film thereon, to be positioned within the magazine. The end of the film is threaded through the openings 17 and 21 and between the rollers 19. It is then properly positioned within the gate of the projecting machine and is secured to the take-up reel. As the machine is actuated, the film will be unwound from the reel 11 and wound upon the reel 23; and as the size of the bundle of film upon these reels changes, the plate 14 will travel along the periphery of the magazine 7 so as to maintain the film at all times in a straight line. This point is best illustrated in the drawings in Figs. 1 and 2. With the parts in the position shown in Fig. 1, practically all of the film is upon the reel 11 and the film is just beginning to be wound from the reel 11 onto the reel 23 and is extending, as shown, in a downward direction; and with the parts in the position shown in Fig. 2, the film is practically all unwound from the reel 11 and onto the reel 23, and when this occurs, the film, as shown, extends in an upward direction, or in a direction at angle to the position it assumed at the commencement of the operation.

If the mouth of the magazine, out through which the film passes from the interior of the magazine, were fixed, the film, when in the position shown in Fig. 2, would lie in the planes indicated by the dotted lines therein, and a crimp would be produced. But since the plate 14 and the component parts forming the mouth-piece of the present construction are capable of adjusting themselves to accommodate this different angle which the film assumes, the portion of the film extending between the reels 11 and 23 will always lie in a straight line, thus eliminating any crimping or bending of the film during the winding or unwinding thereof. The tension of the film will move the plate automatically, so that no mechanism of any nature is required to maintain it in its desired position; and the rollers 19 provide a smooth and easy passage for the film out of the magazine, and also provide a broad and substantial surface for the film to pull against to move the plate 14. By arranging one of the rollers under spring tension, any kinking of the film is prevented as it passes out of the magazine, or an unwrapping of the film from the reel 11 faster than it can be taken up by the mechanism of the projecting machine.

I claim:

1. A magazine for films, comprising a shell-like body portion adapted to receive a roll of film, said body being provided with a movable mouth-piece through which the film passes from the interior of the magazine onto a take-up reel, whereby a bending of the film during such passage is prevented, substantially as described.

2. A magazine for films, comprising a shell-like body portion adapted to receive a roll of film, said body being provided with an elongated opening through which the film passes, and a movable member traveling above said opening and serving as the mouth-piece of the magazine, substantially as described.

3. A magazine for films, comprising a shell-like body portion adapted to receive a roll of film, said body being provided with an elongated opening through which the film passes, and a member slidably mounted upon the periphery of the magazine and serving as the mouth-piece of the magazine, substantially as described.

4. A magazine for films, comprising a shell-like body portion adapted to receive a roll of film, said body having an elongated opening in the periphery thereof, a plate slidably mounted on said periphery and of a size to overlie said opening, said plate having a contracted opening positioned to remain in constant alinement with the opening in the periphery, the film when passing out of said magazine passing through both of said openings, substantially as described.

5. A magazine for films, comprising a shell-like body portion adapted to receive a roll of film, said body having an elongated opening in the periphery thereof, a plate slidably mounted on said periphery and of a size to overlie said opening, said plate having a contracted opening positioned to remain in constant alinement with the opening in the periphery, the film when passing out of said magazine passing through both of said openings, and rotatable members carried by the plate and located in alinement with the opening in the plate, substantially as described.

6. A magazine for films, comprising a shell-like body portion adapted to receive a roll of film, said body being provided with an elongated opening through which the film passes, a movable member traveling above said opening and serving as the mouth-piece of the magazine, and means for limiting the movement of said mouth-piece, substantially as described.

7. A magazine for films, comprising a shell-like body portion adapted to receive a roll of film, said body being provided with an elongated opening through which the film passes, a member slidably mounted upon the periphery of the magazine and serving as the mouth-piece of the magazine, and means for limiting the movement of said mouth-piece, substantially as described.

8. A magazine for films, comprising a shell-like body portion adapted to receive a roll of film, said body being provided with an elongated opening through which the film passes, a movable member traveling above said opening and serving as the mouth-piece of the magazine, and a series of idler rollers forming a portion of the mouth-piece, at least one of said rollers being spring-controlled, substantially as described.

9. A magazine for films, comprising a shell-like body portion adapted to receive a roll of film, said body being provided with an elongated opening through which the film passes, a member slidably mounted upon the periphery of the magazine and serving as the mouth-piece of the magazine, and a series of idler rollers forming a portion of the mouth-piece, at least one of said rollers being spring-controlled, substantially as described.

10. A magazine for films, comprising a shell-like body portion adapted to receive a roll of film, said body having an elongated opening in the periphery thereof, a plate slidably mounted on said periphery and of a size to overlie said opening, said plate having a contracted opening positioned to remain in constant alinement with the opening in the periphery, the film when passing out of said magazine passing through both of said openings, and a series of idler rollers forming a portion of the mouth-piece, at least one of said rollers being spring-controlled, substantially as described.

11. A magazine for films, comprising a shell-like body portion adapted to receive a roll of film, said body having an elongated opening in the periphery thereof, a plate slidably mounted on said periphery and of a size to overlie said opening, said plate having a contracted opening positioned to remain in constant alinement with the opening in the periphery, the film when passing out of said magazine passing through both of said openings, mechanism forming a portion of the mouth-piece, comprising upper and lower idler rollers, and a spring-pressed roller oppositely disposed from the first-mentioned rollers and maintained in constant engagement with at least one of said rollers, substantially as described.

WILLIAM N. SELIG.

Witnesses:
A. ALLEN DAVISON,
HARRY GORDON.